United States Patent
Hayashi

(10) Patent No.: US 9,020,289 B2
(45) Date of Patent: Apr. 28, 2015

(54) IMAGE PROCESSING APPARATUS AND IMAGE PROCESSING METHOD FOR COMPRESSING IMAGE DATA BY COMBINING SPATIAL FREQUENCY CONVERSION, QUANTIZATION, AND ENTROPY CODING

(71) Applicant: KYOCERA Document Solutions Inc., Osaka (JP)

(72) Inventor: Shinji Hayashi, Osaka (JP)

(73) Assignee: KYOCERA Document Solutions Inc. (JP)

( * ) Notice: Subject to any disclaimer, the term of this patent is extended or adjusted under 35 U.S.C. 154(b) by 196 days.

(21) Appl. No.: 13/853,206

(22) Filed: Mar. 29, 2013

(65) Prior Publication Data

US 2013/0259396 A1   Oct. 3, 2013

(30) Foreign Application Priority Data

Mar. 29, 2012   (JP) .................................. 2012-078240

(51) Int. Cl.
| | |
|---|---|
| G06K 9/00 | (2006.01) |
| G06K 9/36 | (2006.01) |
| G06K 9/46 | (2006.01) |
| G06T 9/00 | (2006.01) |

(52) U.S. Cl.
CPC ....................................... G06T 9/00 (2013.01)

(58) Field of Classification Search
CPC ...... G06T 9/007; H04N 1/415; H04N 19/124; H04N 19/18; H04N 19/625
USPC ............... 382/166, 250, 251, 239; 348/395.1, 348/403.1; 358/426.14; 375/240.03, 240.2
See application file for complete search history.

(56) References Cited

U.S. PATENT DOCUMENTS 5,822,005 A * 10/1998 Horne ...................... 375/240.03
6,577,681 B1    6/2003 Kimura (Continued)

FOREIGN PATENT DOCUMENTS

| JP | 2000-092330 | 3/2000 |
|---|---|---|
| JP | 2004-120355 | 4/2004 |

OTHER PUBLICATIONS

Pao et al. ("Encoding stored video for streaming applications," IEEE Trans. Circuits and Systems for Video Technology, vol. 11, No. 2, Feb. 2001, 199-209).*

*Primary Examiner* — Yubin Hung
(74) *Attorney, Agent, or Firm* — McDonnell Boehnen Hulbert & Berghoff LLP

(57) ABSTRACT

An image processing apparatus is configured for compressing image data by combining spatial frequency conversion, quantization, and entropy coding. The apparatus includes a block division section, a spatial frequency conversion section, a quantization section, an encoding section, and a selection section. The encoding section generates code data by performing the entropy coding for each of a plurality of change candidate values. The values include a value of quantized data in a pixel block after performing the spatial frequency conversion and peripheral values within a predetermined range. The selection section selects a change value of the quantized data from the plurality of change candidate values based on a size of the code data of each of the plurality of change candidate values, and sets the code data corresponding to the selected change value as the code data.

13 Claims, 5 Drawing Sheets

(56) References Cited

U.S. PATENT DOCUMENTS

| | | |
|---|---|---|
| 2004/0066973 A1* | 4/2004 | Prakash et al. ................. 382/239 |
| 2004/0160625 A1 | 8/2004 | Kondo |
| 2006/0222245 A1* | 10/2006 | Sakai et al. ................... 382/232 |
| 2007/0092146 A1* | 4/2007 | Alvarez et al. ................. 382/236 |
| 2009/0092330 A1* | 4/2009 | Koroteev et al. ............... 382/251 |
| 2010/0092099 A1* | 4/2010 | Richter .......................... 382/244 |
| 2010/0158105 A1* | 6/2010 | Garg et al. ................ 375/240.03 |
| 2011/0080946 A1* | 4/2011 | Li et al. .................... 375/240.03 |

* cited by examiner

| pattern | relationship between Q(i-1) and Q(i) | data size | relationship between Q(i) and Q(i+1) | change candidate value of quantized data |
|---|---|---|---|---|
| #1 | Q(i-1)=Q(i) | 20% | Q(i)=Q(i+1) | Q(i) |
| #2 | Q(i-1)=Q(i) | 20% | Q(i+1)=Q(i)+1  or  Q(i+1)=Q(i)-1 | Q(i)-1, Q(i), Q(i)+1 |
| #3 | Q(i-1)=Q(i) | 20% | Q(i+1)>Q(i)+1  or  Q(i+1)<Q(i)-1 | Q(i) |
| #4 | Q(i-1)=Q(i)+1  or  Q(i-1)=Q(i)-1 | 50% | Q(i)=Q(i+1) | |
| #5 | Q(i-1)=Q(i)+1  or  Q(i-1)=Q(i)-1 | 50% | Q(i+1)=Q(i)+1  or  Q(i+1)=Q(i)-1 | Q(i)-1, Q(i), Q(i)+1 |
| #6 | Q(i-1)=Q(i)+1  or  Q(i-1)=Q(i)-1 | 50% | Q(i+1)>Q(i)+1  or  Q(i+1)<Q(i)-1 | |
| #7 | Q(i-1)>Q(i)+1  or  Q(i-1)<Q(i)-1 | 100% | Q(i)=Q(i+1) | Q(i) |
| #8 | Q(i-1)>Q(i)+1  or  Q(i-1)<Q(i)-1 | 100% | Q(i+1)=Q(i)+1  or  Q(i+1)=Q(i)-1 | Q(i)-1, Q(i), Q(i)+1 |
| #9 | Q(i-1)>Q(i)+1  or  Q(i-1)<Q(i)-1 | 100% | Q(i+1)>Q(i)+1  or  Q(i+1)<Q(i)-1 | Q(i) |

FIG. 4 condition:
- the value of the data on the element of interest obtained after the spatial frequency conversion (DCT) is 99
- the quantization factor of the element of interest is 20
- the value of the quantized data on the element immediately before the element of interest is 5
- the value of the quantized data on the element of interest is 4
- the value of the quantized data on the element immediately after the element of interest is 4

| change candidate value | quantized error (absolute value):X1 | weighting factor for X1 | code data size:X2 | weighting factor for X2 | difference(absolute value) from quantized data on the element immediately after the element of interest:X3 | weighting factor for X3 | evaluation value |
|---|---|---|---|---|---|---|---|
| 5 | 1 | 1 | 20% | 40 | 1 | 20 | 29 |
| 4 | 19 | 1 | 50% | 40 | 0 | 20 | 39 |
| 3 | 39 | 1 | 100% | 40 | 1 | 20 | 99 |

FIG.5

IMAGE PROCESSING APPARATUS AND IMAGE PROCESSING METHOD FOR COMPRESSING IMAGE DATA BY COMBINING SPATIAL FREQUENCY CONVERSION, QUANTIZATION, AND ENTROPY CODING

INCORPORATION BY REFERENCE

This application is based upon and claims the benefit of priority from corresponding Japanese Patent Application No. 2012-078240, filed on Mar. 29, 2012, the entire contents of which are fully incorporated herein by reference.

BACKGROUND

The present disclosure relates to an image processing apparatus and an image processing method for compressing image data by combining spatial frequency conversion, quantization, and entropy coding.

Compression technologies for the image data based on a combination of the spatial frequency conversion, the quantization, and the entropy coding, such as a Joint Photographic Experts Group (JPEG) format and a JPEG 2000 format are widespread.

In general, in the JPEG format, an ability to compress data or a "compressibility" can be changed as necessary by changing a quantization table. In a normal state, when the compressibility is increased, image quality may deteriorate after expanding the image, otherwise referred to as an "expansion."

In one technology, a quantization table may be changed so as to increase the compressibility. In particular, the change may reduce an encoded data size while suppressing deterioration of the image quality.

Alternatively, in another technology, a quantization factor is changed by changing a scaling factor for each pixel block based on image contents, to thereby increase the compressibility.

In some instances, the quantization factor may be changed for each pixel block. Hence, it may be difficult to reduce the encoded data size in consideration of a change in the image contents. In particular, the change may be within a range that is spatially shorter than a size of the pixel block. Further, the quantization may correspond to the change in the image contents within a range. In some instances, this range may be spatially shorter than a size of the pixel block and the quantization may not be performed, which is not preferred for image quality.

SUMMARY

According to an aspect of the present disclosure, an image processing apparatus may be configured for compressing image data by combining spatial frequency conversion, quantization, and entropy coding. In some instances, the image processing apparatus includes a block division section, a spatial frequency conversion section, a quantization section, an encoding section, and a selection section. The block division section divides the image data into pixel blocks. The spatial frequency conversion section performs the spatial frequency conversion on image data for each of the pixel blocks obtained from the block division section. The quantization section generates quantized data for each of the pixel blocks after performing the spatial frequency conversion by the spatial frequency conversion section. The encoding section generates code data by performing the entropy coding for each of a plurality of change candidate values including: (a) a value of the quantized data on an element of interest in a pixel block after performing the spatial frequency conversion and (b) peripheral values to a value within a predetermined range. The selection section selects a change value of the quantized data on the element of interest from the plurality of change candidate values, where selecting the change value is based on a size of the code data of each of the plurality of change candidate values, and where the selection section sets the code data corresponding to the selected change value as the code data on the element of interest.

According to another aspect of the present disclosure, an image processing method may provide for compressing image data by combining spatial frequency conversion, quantization, and entropy coding. In some instances, the image processing method includes: dividing the image data, performing the spatial frequency conversion, generating quantized data, generating code data, and selecting a change value of the quantized data. The dividing of the image data includes dividing the image data into pixel blocks. The performing of the spatial frequency conversion includes performing the spatial frequency conversion on image data for each of the pixel blocks obtained from dividing the image data. The generating of the quantized data includes generating quantized data for each of the pixel blocks after the spatial frequency conversion. The generating of the code data includes generating code data by performing the entropy coding for each of a plurality of change candidate values including: (a) a value of the quantized data on an element of interest in a pixel block after the spatial frequency conversion and (b) peripheral values to a value within a predetermined range. The selecting includes selecting a change value of the quantized data on the element of interest from the plurality of change candidate values, where selecting the change value is based on a size of the code data of each of the plurality of change candidate values, and where the image processing method further include setting the code data corresponding to the selected change value as the code data on the element of interest.

According to another aspect of the present disclosure, a computing device includes a processor and a non-transitory computer-readable medium. The non-transitory computer-readable medium is configured to store program instructions that, when executed by the processor, cause the computing device to carry out functions. The functions may be for compressing image data by combining spatial frequency conversion, quantization, and entropy coding. In some instances, the functions further include: dividing the image data, performing the spatial frequency conversion, generating quantized data, generating code data, and selecting a change value of the quantized data. The dividing of the image data includes dividing the image data into pixel blocks. The performing of the spatial frequency conversion includes performing the spatial frequency conversion on image data for each of the pixel blocks obtained from dividing the image data. The generating of the quantized data includes generating quantized data for each of the pixel blocks after the spatial frequency conversion. The generating of the code data includes generating code data by performing the entropy coding for each of a plurality of change candidate values including: (a) a value of the quantized data on an element of interest in a pixel block after the spatial frequency conversion and (b) peripheral values to a value within a predetermined range. The selecting includes selecting a change value of the quantized data on the element of interest from the plurality of change candidate values, where selecting the change value is based on a size of the code data of each of the plurality of change candidate values, and where the functions further include setting the code data corresponding to the selected change value as the code data on the element of interest.

Additional features and advantages are described herein, and will be apparent from the following Detailed Description and the figures.

BRIEF DESCRIPTION OF THE FIGURES

In the accompanying drawings:

FIG. 4 is a diagram illustrating an operation of a candidate generation section of FIG. 1, according to an example embodiment of the present disclosure; and FIG. 5 is a diagram illustrating an operation of a selection section of FIG. 1, according to an example embodiment of the present disclosure.

DETAILED DESCRIPTION

Reference will now be made in detail to various embodiments of the disclosure. Further, one or more examples of which may be illustrated in the accompanying drawings. Each example is provided by way of explanation of the disclosure, and by no way limiting the present disclosure. In fact, it will be apparent to those skilled in the art that various modifications, combinations, additions, deletions, and variations can be made in the present disclosure without departing from the intended scope or spirit. Features illustrated or described as part of one embodiment can be used in another embodiment to yield a still further embodiment. It is intended that the present disclosure cover such modifications, combinations, additions, deletions, applications, and variations that come within the scope of the appended claims and their equivalents.

A description is made below of an embodiment of the present disclosure with reference to the accompanying drawings.

Figure 1:
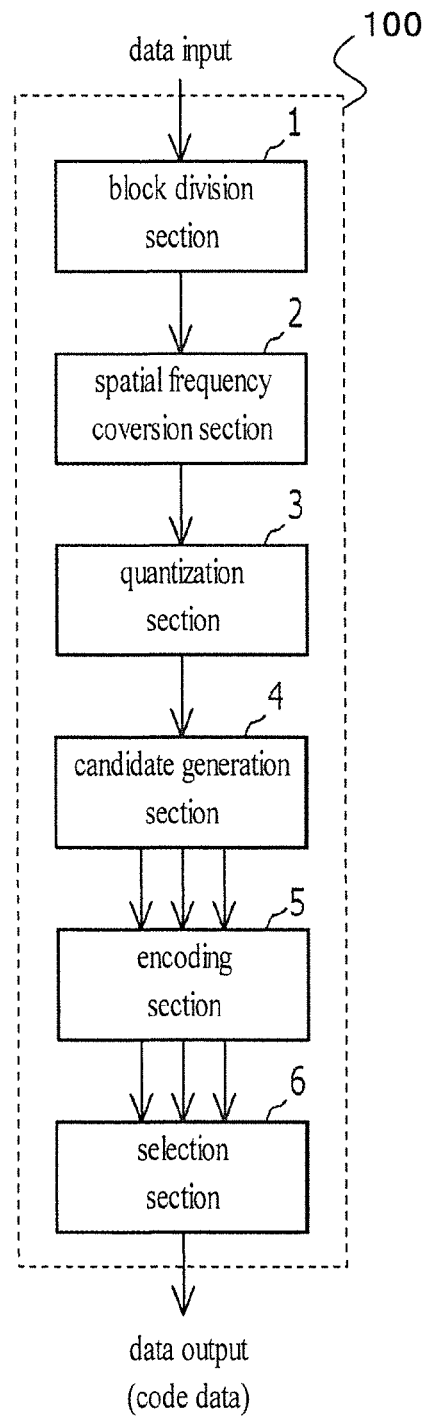
FIG. 1 is a block diagram illustrating a configuration of an image processing apparatus, according to an example embodiment of the present disclosure.

FIG. 1 is a block diagram illustrating a configuration of an image processing apparatus 100, according to an example embodiment of the present disclosure. The image processing apparatus 100 may be part of an image forming apparatus such as a printer or a multifunction peripheral. Further, the image processing apparatus 100 can be used for compressing image data including an image with a grid of dots. The image processing apparatus 100 reads the image data from a storage device (such as random access memory (RAM) or hard disk drive) (not shown), encodes the image data in a predetermined coding format (in this example, JPEG format), and outputs encoded image data to the storage device (not shown).

The image processing apparatus 100 illustrated in FIG. 1 includes a block division section 1, a spatial frequency conversion section 2, a quantization section 3, a candidate generation section 4, an encoding section 5, and a selection section 6.

The block division section 1 is a processing section that divides the image data into pixel blocks. In this embodiment, the image data is divided into the pixel blocks such that each pixel block has a length of eight pixels in each of a main-scanning direction and a sub-scanning direction.

The spatial frequency conversion section 2 is an additional processing section that performs spatial frequency conversion. In some instances, the spatial frequency conversion may be performed for the image data on each of the pixel blocks obtained from dividing the image data in the block division section 1. In this embodiment, discrete cosine transform (DCT) is executed as the spatial frequency conversion.

The quantization section 3 is a processing section that generates quantized data by quantizing data on each of the pixel blocks after the spatial frequency conversion by the spatial frequency conversion section 2. For example, for each element in the pixel block after the spatial frequency conversion, the quantization section 3 refers to a quantization table to identify a quantization factor of the element. Further the quantization section 3 quantizes the value of data on the element obtained after the spatial frequency conversion by the quantization factor. As such, the quantization section 3 generates the quantized data on the element.

The candidate generation section 4 is a processing section that generates a plurality of values that may be referred to as "change candidate values." Further, the change candidate values may correspond to an element of interest from the quantized data in the pixel block.

The plurality of change candidate values may include the value of the quantized data on the element of interest in the pixel block after the spatial frequency conversion. Further, the plurality of change candidate values may also include peripheral values to a value within a predetermined range. In this embodiment, the plurality of change candidate values may include three values: a value Q(i) of the quantized data on the element of interest generated by the quantization section 3, a value Q(i)−1 obtained by subtracting one from the value, and a value Q(i)+1 obtained by adding one to the value.

The encoding section 5 is a processing section that generates data that may be referred to as "code data." The code data may be generated by performing entropy coding for each of the plurality of change candidate values. In this embodiment, Huffman coding is executed as the entropy coding.

Further, in this embodiment, there may be a case where none of the values of the quantized data are equal to any one of the above-mentioned plurality of change candidate values. In some instances, the value of the quantized data on an element immediately before and immediately after the element of interest may not equal any one of the above-mentioned plurality of change candidate values. Further, in some instances, none of the values of quantized data may equal the plurality of change candidate values, excluding the value of the quantized data on the element of interest generated by the quantization section 3. In such instances, the encoding section 5 generates the code data by performing the entropy coding for the value of the quantized data on the element of interest. Further, the encoding section 5 may generate the code data without encoding the above-mentioned plurality of change candidate values, excluding the value of the quantized data on the element of interest. In other words, in that case, the value of the quantized data on the element of interest is not changed. Accordingly, necessary time for encoding processing becomes shorter.

It should be noted that the "element immediately before the element of interest" represents an element immediately preceding the element of interest in a scan order of the elements at the time of the encoding. Further, the "element immediately after the element of interest" represents an element immediately succeeding the element of interest in the scan order of the elements at the time of the encoding. Yet further, in this case, the scan order at the time of the encoding represents an order in which pieces of data that have been subjected to the spatial frequency conversion are arrayed sequentially from an area having the lowest spatial frequency.

The selection section 6 is a processing section that selects a value after a change of the quantized data or a "change value" on the element of interest from the plurality of change candidate values. In some instances, the selection section 6 may select a change value based on a size of the code data of each of the plurality of change candidate values. Further, in some instances, the selection section 6 may set the code data corresponding to the selected change value as the code data on the element of interest. It should be noted that the value of the quantized data on the element of interest is updated by the change value.

In this embodiment, the selection section 6 selects the change value of the quantized data on the element of interest from the above-mentioned plurality of change candidate values. In some instances, the selection section 6 may select a change value based on the size of the code data on each of the above-mentioned plurality of change candidate values. In some instances, the selection section 6 may select a change amount based on the value of the quantized data on the element immediately after the element of interest and each of the above-mentioned plurality of change candidate values. Yet further, in some instances, the selection section 6 may select a quantization error regarding each of the above-mentioned plurality of change candidate values.

In some embodiments, the above-mentioned size of the code data, the above-mentioned change amount, and the above-mentioned quantization error may each have a weighting factor set in advance. In some instances, the selection section 6 calculates a sum of products based on the size of the code data, the above-mentioned change amount, and the quantization error based on the weighting factors. For example, a sum of the size of the code data may be multiplied by a first weighting factor, the above-mentioned change amount may be multiplied by a second weighting factor, and the quantization error may be multiplied by a third weighting factor. As such, these three weighting factors may be used to calculate an evaluation value for each of the above-mentioned plurality of change candidate values. Further, based on the evaluation value, the change value of the quantized data on the element of interest may be selected from the above-mentioned plurality of change candidate values.

It should be noted that each of the above-mentioned processing sections of the image processing apparatus 100 may be implemented by a computer executing a program. In some instance, each section maybe implemented by a dedicated electronic circuit (for example, application specific integrated circuit (ASIC)). Further, the image processing apparatus 100 may be integrated into, for example, a personal computer (PC) instead of an image forming apparatus such as the printer or the multifunction peripheral.

Figure 2:
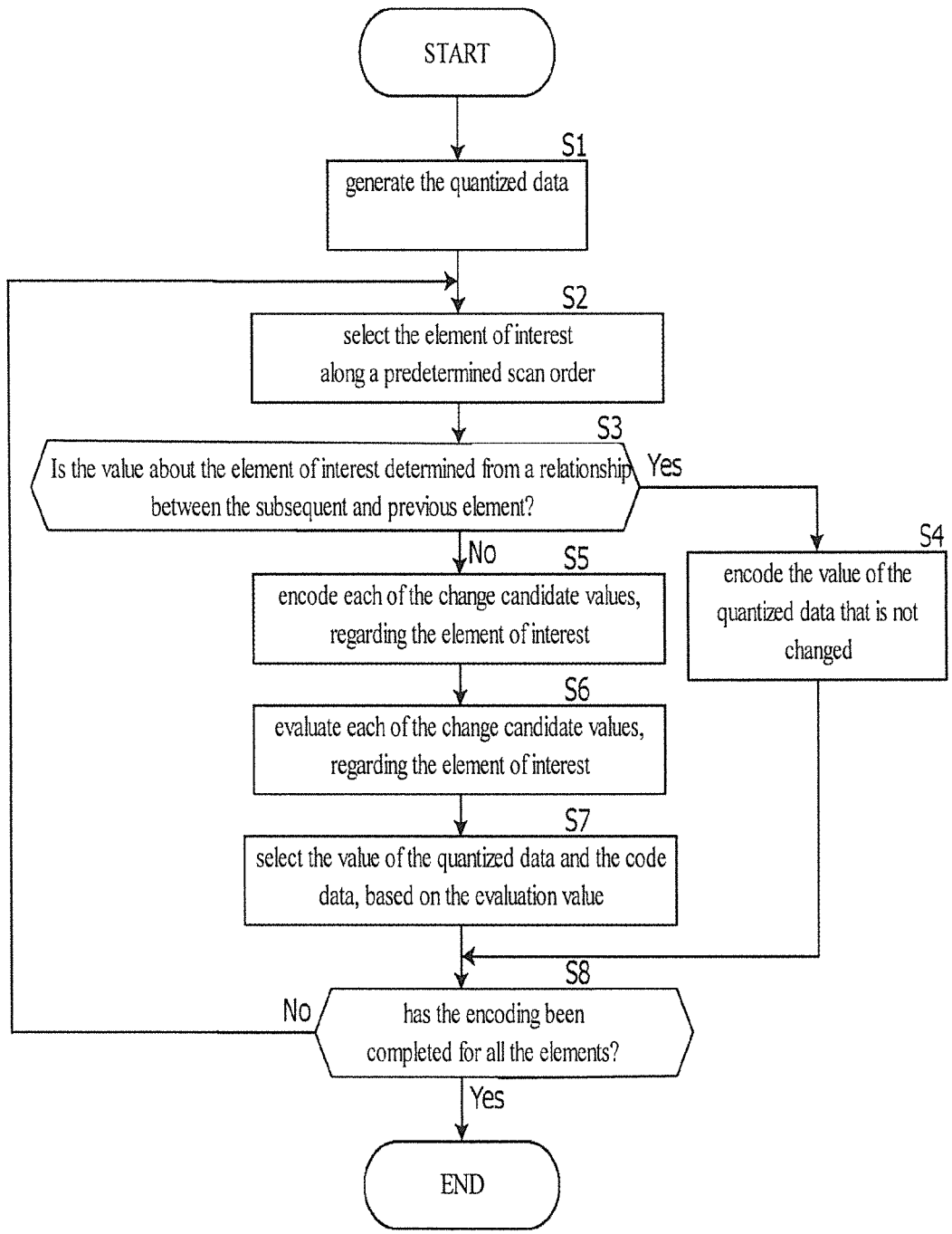
FIG. 2 is a flowchart illustrating an operation of the image processing apparatus illustrated in FIG. 1, according to an example embodiment of the present disclosure.

One of the goals in this next section is to provide a description of an operation of the above-mentioned image processing apparatus 100. FIG. 2 is a flowchart illustrating the operation of the image processing apparatus 100 illustrated in FIG. 1, according to an example of the present disclosure.

In some embodiments, the block division section 1 divides the image data into pixel blocks, the spatial frequency conversion section 2 performs the spatial frequency conversion of image data on each of the pixel blocks, and the quantization section 3 generates the quantized data by quantizing data on the each of the pixel blocks. In some instances, the data is quantized after the spatial frequency conversion by the spatial frequency conversion section 2 (Step S1).

Subsequently, the candidate generation section 4 selects the element of interest in the pixel block after the spatial frequency conversion along a predetermined scan order (Step S2).

Figure 3:
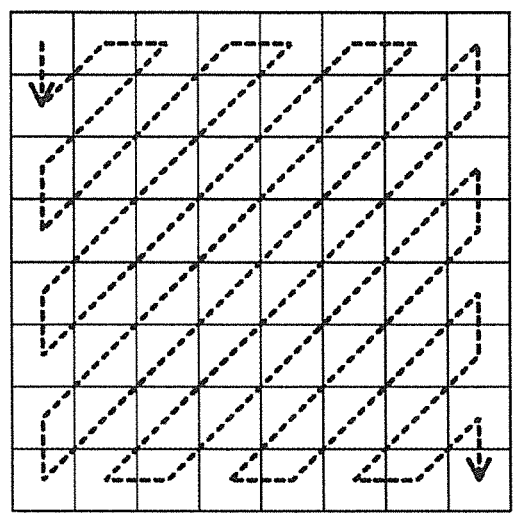
FIG. 3 is a diagram illustrating a scan order of elements in a pixel block at the time of encoding, according to an example embodiment of the present disclosure.

For example, FIG. 3 is a diagram illustrating the scan order of the elements in the pixel block at the time of the encoding, according to an example of the present disclosure. As illustrated in FIG. 3, the elements in the pixel block are scanned sequentially from the one element having the lowest spatial frequency to the one element having the highest spatial frequency.

In some embodiments, the candidate generation section 4 determines whether or not the value of the quantized data on the element of interest is determined. In particular, such determinations may be based on a relationship between the value of the quantized data on the element of interest, the values of the quantized data on the element immediately before the element of interest, and the element immediately after the element of interest (Step S3). FIG. 4 is a diagram illustrating an operation of the candidate generation section 4 of FIG. 1.

It should be noted that considering the value of the quantized data on the "element immediately before the element of interest," the value is updated when the element of interest is used.

In this embodiment, as illustrated in FIG. 4, the value $Q(i)$ represents the quantized data on the element of interest, a value $Q(i-1)$ represents the quantized data on the element immediately before the element of interest, and a value $Q(i+1)$ represents the quantized data on the element immediately after the element of interest. As such, there are classifications of nine patterns. It should be noted that the size of the code data in FIG. 4 may be expressed by a ratio assuming that the size of the code data is 100% where a difference (absolute value) between the value of the quantized data on the element of interest and the value of the quantized data on the element immediately before the element of interest is greater than or equal to 2. In patterns #1 to #3, an encoded data size is 20% because a correlation between the elements is high (values are close). However, considering patterns #4 to #6, the encoded data size increases to 50% because the correlation between the elements is low. Further, in patterns #7 to #9, the encoded data size increases to 100% because the correlation between the elements becomes much lower. As such, the encoded data size may be inversely proportional to the correlation between elements or vice versa.

In some embodiments, the value of the quantized data on the element of interest is determined from the relationship between this value and the values of the quantized data on the element immediately before the element of interest and the element immediately after the element of interest. For example, where the value of the quantized data on the element of interest is unchanged, the candidate generation section 4 outputs the value of the quantized data on the element of interest generated by the quantization section 3. Further, the candidate generation section 4 may output this value to the encoding section 5 as is, and the encoding section 5 may encode the value of the quantized data (Step S4). For patterns #1, #3, #7, and #9 in FIG. 4, the value of the quantized data on the element of interest is unchanged.

On the other hand, consider that the value of the quantized data on the element of interest is not determined from the relationship between this value and the values of the quantized data on the element immediately before the element of interest and the element immediately after the element of interest. For example, in a case where the value of the quantized data on the element of interest may be changed, the candidate generation section 4 outputs the change candidate values. In this embodiment, multiple values of the quantized data may be generated by the quantization section 3, e.g., the value plus one and the value minus one. In some instances, the candidate generation section 4 outputs the candidate change values regarding the element of interest to the encoding section 5 and the encoding section 5 encodes each of the change candidate values (Step S5). In the case of the patterns #2, #4 to #6, and #8 in FIG. 4, the three change candidate values are subjected to the encoding.

It should be noted that the element having the lowest spatial frequency (e.g., the element of a DC component) is selected. In some instances, there is no element immediately before the element with the lowest spatial frequency. Thus, the quantized data on the element is encoded without having the value changed.

For each of the change candidate values, the selection section 6 identifies the absolute value of the quantization error. Further, the selection section 6 identifies a size of the encoded data and the absolute value of the change amount (difference) from the value of the quantized data on the element immediately after the element of interest. Further, the selection section 6 calculates the sum of products between those pieces of information and predetermined weighting factors corresponding thereto as the evaluation value (Step S6).

FIG. 5 is a diagram illustrating an operation of the selection section 6 of FIG. 1, according to an example of the present disclosure. As illustrated in FIG. 5, the evaluation value is calculated for each of the change candidate values. FIG. 5 illustrates an example in which the value of the data on the element of interest obtained after the spatial frequency conversion is 99 with the quantization factor having a value of 20. In this case, the quantized data on the element of interest is a quotient obtained by dividing 99 by 20, in other words, 4 (in a case of rounding down). It should be noted that the value of the quantized data on the element immediately before the element of interest is 5 and the value of the quantized data on the element immediately after the element of interest is 4.

In this case, FIG. 5 illustrates a quantization error as "(absolute value):X1" of the element of interest. The quantization error is obtained by the following equation: $X1=199-20\times41=19$. Further, in a case where the quantized data is changed to $4+1=5$, the quantization error is obtained by the following equation, $X1=199-20\times51=1$. Further, in a case where the quantized data is changed to $4-1=3$, the quantization error is obtained by the following equation, $X1=199-20\times31=39$.

Further, in the example of FIG. 5, a weighting factor of 1 is set in advance for the quantization error X1. Further, a weighting factor of 40 is set in advance for a code data size X2. Yet further, a weighting factor of 20 is set in advance for a difference (absolute value) X3 from the quantized data on the element immediately after the element of interest. Therefore, in the case where the quantized data is changed to 5, the evaluation value is obtained by the following equation, $1\times1+0.2\times40+1\times20=29$.

In addition, based on the evaluation value, the selection section 6 selects one of the change candidate values as the change value of the quantized data on the element of interest. Further, the selection section 6 outputs the code data corresponding to the selected change candidate value as the code data on the element of interest (Step S7).

In the case illustrated in FIG. 5, the change candidate value of "5", the lowest evaluation value, is selected as the change value of the quantized data on the element of interest. It should be noted that where a plurality of change candidate values has the lowest evaluation value, the one having the smallest amount of change may be selected. In particular, the value may be selected based on the smallest difference between an original value of the quantized data and the change candidate value.

In addition, the candidate generation section 4 determines whether or not the encoding has been completed for all the elements in the pixel block (Step S8). If there is a subsequent element, the candidate generation section 4 sets the subsequent element as the element of interest to again execute the processing from Step S2 in accordance with the encoding section 5 and the selection section 6.

It should be noted that when it is determined that the encoding has been completed for all the elements in the pixel block, the candidate generation section 4, the encoding section 5, and the selection section 6 perform the same processing for the next pixel block. Further, these sections keep processing the subsequent pixel blocks in the same manner until the processing is completed for all the pixel blocks in the image data.

As described above, according to the above-mentioned embodiment, the encoding section 5 generates the code data by performing the entropy coding for each of the plurality of change candidate values. In some instances, the entropy coding may be performed where the plurality of change candidate values includes the value of the quantized data on the element of interest and the peripheral values to the value within the predetermined range. As noted, the selection section 6 selects the change value of the quantized data on the element of interest from the plurality of change candidate values. In some instances, the selection section 6 may select the value based on at least the size of the code data on each of the plurality of change candidate values. Further, the selection section 6 sets the code data corresponding to the selected change value as the code data on the element of interest.

Accordingly, even if image contents exhibit a change having a relatively high spatial frequency, the quantized data is adjusted for each of the elements in the pixel block. Thus, it is possible to reduce the size of the encoded data while suppressing deterioration of image quality.

It should be noted that the above-mentioned embodiments are examples of the present invention and the present invention is not limited to these examples. Various modifications and changes can be made within the scope that does not depart from the gist of the present invention.

For example, in some embodiments, the encoding is performed in the JPEG format. In addition, the encoding may be performed in a JPEG 2000 format. In that case, a wavelet transform is executed as the spatial frequency conversion and embedded block coding with optimized truncation (EBCOT) is executed as the entropy coding.

Further, in some embodiments, consider the value of data on the element of interest obtained after the spatial frequency conversion such that it is the maximum value within a range (for example, 0 to 255). In such instances, the change candidate value (in the above-mentioned case, $Q(i)+1$) that is larger than the value of the quantized data may not be generated. In the some instances, such as in the above-mentioned embodiments, the value of the data on the element of interest obtained after the spatial frequency conversion may be the minimum value within the range that can be assumed by the value. As such, the change candidate value (in the above-mentioned case, $Q(i)-1$) that is smaller than the value of the quantized data may not be generated.

Further, in some embodiments, a range (e.g., a range between plus and minus one in the above-mentioned examples) of the change candidate value is fixed for the data obtained after the spatial frequency conversion. In some instances, the range may be changed depending on the spatial frequency. In particular, the range may be changed depending on a position of the element in the pixel block after the spatial frequency conversion. For example, as the frequency becomes higher, the range of the change candidate value may be increased.

Further, in some embodiments, the value of the quantized data may be adjusted in the above-mentioned manner only for the element with a given spatial frequency. In some instances, the value may be adjusted only if the spatial frequency is greater than or equal to a predetermined spatial frequency in the pixel block after the spatial frequency conversion. In addition, for the element having a spatial frequency lower than the predetermined spatial frequency, the value of the quantized data generated by the quantization section 3 maybe immediately encoded. In some instances, the value may be immediately encoded without performing the adjustment of the value of the quantized data.

Further, in some embodiments, the candidate generation section 4 may set all the values exhibiting the quantization error within a predetermined range as the change candidate values of the quantized data.

Further, in some embodiments, the candidate generation section 4 may exclude the generated change candidate values that exhibit the quantization error exceeding a predetermined threshold value from the change candidate values.

By taking the quantization error into consideration, it is possible to suppress the deterioration of the image quality.

The invention is claimed as follows:

1. An image processing method for compressing image data by combining spatial frequency conversion, quantization, and entropy coding, the image processing method comprising:
   dividing the image data into pixel blocks;
   performing the spatial frequency conversion on image data for each of the pixel blocks obtained from dividing the image data;
   generating quantized data for each of the pixel blocks after performing the spatial frequency conversion;
   generating code data by performing the entropy coding for each of a plurality of change candidate values comprising: (a) a value of the quantized data on an element of interest in a pixel block after performing the spatial frequency conversion and (b) peripheral values to the value of the quantized data on an element of interest within a predetermined range; and
   selecting one of the plurality of change candidate values as a change value of the quantized data on the element of interest, wherein selecting the change value is based on a size of the code data of each of the plurality of change candidate values, and wherein the image processing method further comprises setting the code data corresponding to the selected change value as the code data on the element of interest,
   wherein the image processing method further comprises selecting a change amount between the value of the quantized data on an element immediately after the element of interest and each of the plurality of change candidate values.

2. The image processing method of claim 1 further comprising selecting a quantization error regarding each of the plurality of change candidate values.

3. The image processing method of claim 2, wherein:
   the size of the code data, the change amount, and the quantization error each have a weighting factor; and
   the image processing method further comprises calculating a sum of products based on the size of the code data, the change amount, the quantization error, and the weighting factors, wherein the image processing method further comprises calculating the sum of products for an evaluation value for each of the plurality of change candidate values, and wherein the image processing method further comprises selecting the change value of the quantized data on the element of interest from the plurality of change candidate values based on the evaluation value.

4. The image processing method of claim 1, wherein the element of interest is an element having a spatial frequency greater than or equal to a predetermined spatial frequency, and wherein the element of interest is one element among other elements in the pixel block.

5. An image processing apparatus for compressing image data by combining spatial frequency conversion, quantization, and entropy coding, the image processing apparatus comprising:
   a block division section that divides the image data into pixel blocks;
   a spatial frequency conversion section that performs the spatial frequency conversion on image data for each of the pixel blocks obtained from the block division section;
   a quantization section that generates quantized data for each of the pixel blocks after performing the spatial frequency conversion by the spatial frequency conversion section;
   an encoding section that generates code data by performing the entropy coding for each of a plurality of change candidate values comprising: (a) a value of the quantized data on an element of interest in a pixel block after performing the spatial frequency conversion and (b) peripheral values to the value of the quantized data on an element of interest within a predetermined range; and
   a selection section that selects one of the plurality of change candidate values as a change value of the quantized data on the element of interest, wherein selecting the change value is based on a size of the code data of each of the plurality of change candidate values, and wherein the selection section sets the code data corresponding to the selected change value as the code data on the element of interest,
   wherein the selection section further selects a change amount between the value of the quantized data on an element immediately after the element of interest and each of the plurality of change candidate values.

6. The image processing apparatus according to claim 5, wherein the selection section further selects a quantization error regarding each of the plurality of change candidate values.

7. The image processing apparatus according to claim 6, wherein:
   the size of the code data, the change amount, and the quantization error each have a weighting factor; and
   the selection section calculates a sum of products based on the size of the code data, the change amount, the quantization error, and the weighting factors, wherein the selection section further calculates the sum of products for an evaluation value for each of the plurality of change candidate values, and wherein the selection section further selects the change value of the quantized data on the element of interest from the plurality of change candidate values based on the evaluation value.

8. The image processing apparatus according to claim 5, wherein the element of interest is an element having a spatial frequency greater than or equal to a predetermined spatial frequency, and wherein the element of interest is one element among other elements in the pixel block.

9. The image processing apparatus according to claim 5, wherein:
at least one value of the quantized data on an element immediately before the element of interest or on an element immediately after the element of interest is equal to one of the plurality of change candidate values, wherein the plurality of change candidate values excludes the value of the quantized data on the element of interest generated by the quantization section; or
none of the values of the quantized data on the element immediately before the element of interest or on the element immediately after the element of interest are equal to any one of the plurality of change candidate values, wherein the plurality of change candidate values excludes the value of the quantized data on the element of interest generated by the quantization section, and wherein the encoding section generates the code data by performing the entropy coding for the value of the quantized data on the element of interest without encoding the plurality of change candidate values.

10. The image processing apparatus according to claim 5, wherein:
the spatial frequency conversion section executes discrete cosine transform as the spatial frequency conversion; and
the encoding section executes Huffman coding as the entropy coding.

11. An image processing apparatus for compressing image data by combining spatial frequency conversion, quantization, and entropy coding, the image processing apparatus comprising:
a block division section that divides the image data into pixel blocks;
a spatial frequency conversion section that performs the spatial frequency conversion on image data for each of the pixel blocks obtained from the block division section;
a quantization section that generates quantized data for each of the pixel blocks after performing the spatial frequency conversion by the spatial frequency conversion section;
an encoding section that generates code data by performing the entropy coding for each of a plurality of change candidate values comprising: (a) a value of the quantized data on an element of interest in a pixel block after performing the spatial frequency conversion and (b) peripheral values to the value of the quantized data on an element of interest within a predetermined range; and
a selection section that selects one of the plurality of change candidate values as a change value of the quantized data on the element of interest, wherein selecting the change value is based on a size of the code data of each of the plurality of change candidate values, and wherein the selection section sets the code data corresponding to the selected change value as the code data on the element of interest,
wherein the predetermined range for the plurality of change candidate values is set based on a spatial frequency of the element of interest.

12. An image processing apparatus for compressing image data by combining spatial frequency conversion, quantization, and entropy coding, the image processing apparatus comprising:
a block division section that divides the image data into pixel blocks;
a spatial frequency conversion section that performs the spatial frequency conversion on image data for each of the pixel blocks obtained from the block division section;
a quantization section that generates quantized data for each of the pixel blocks after performing the spatial frequency conversion by the spatial frequency conversion section;
an encoding section that generates code data by performing the entropy coding for each of a plurality of change candidate values comprising: (a) a value of the quantized data on an element of interest in a pixel block after performing the spatial frequency conversion and (b) peripheral values to the value of the quantized data on an element of interest within a predetermined range; and
a selection section that selects one of the plurality of change candidate values as a change value of the quantized data on the element of interest, wherein selecting the change value is based on a size of the code data of each of the plurality of change candidate values, and wherein the selection section sets the code data corresponding to the selected change value as the code data on the element of interest,
wherein at least one of the plurality of change candidate values has a quantization error exceeding a predetermined threshold value, and wherein the at least one of the plurality of change candidate values is excluded from the plurality of change candidate values.

13. An image processing apparatus for compressing image data by combining spatial frequency conversion, quantization, and entropy coding, the image processing apparatus comprising:
a block division section that divides the image data into pixel blocks;
a spatial frequency conversion section that performs the spatial frequency conversion on image data for each of the pixel blocks obtained from the block division section;
a quantization section that generates quantized data for each of the pixel blocks after performing the spatial frequency conversion by the spatial frequency conversion section;
an encoding section that generates code data by performing the entropy coding for each of a plurality of change candidate values comprising: (a) a value of the quantized data on an element of interest in a pixel block after performing the spatial frequency conversion and (b) peripheral values to the value of the quantized data on an element of interest within a predetermined range; and
a selection section that selects one of the plurality of change candidate values as a change value of the quantized data on the element of interest, wherein selecting the change value is based on a size of the code data of each of the plurality of change candidate values, and wherein the selection section sets the code data corresponding to the selected change value as the code data on the element of interest,
wherein the plurality of change candidate values comprise the value of the quantized data on the element of interest, a value obtained by subtracting one from the value of the quantized data on the element of interest, and a value obtained by adding one to the value of the quantized data on the element of interest.

* * * * *